May 20, 1958   D. C. MORRIS   2,834,988
MOLD FOR 47-TYPE CONNECTOR BLOCK BODIES
Filed March 24, 1954   2 Sheets-Sheet 1
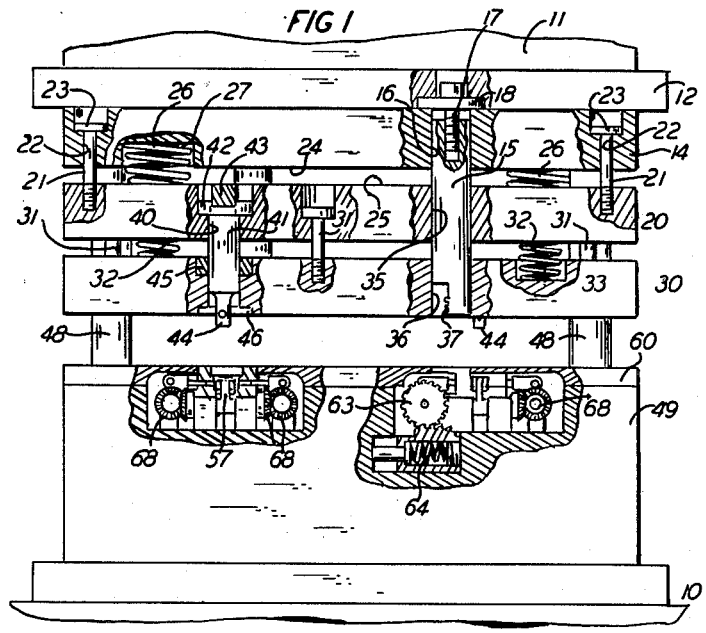
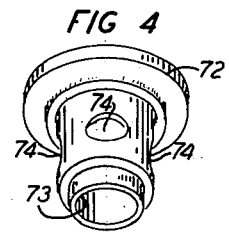
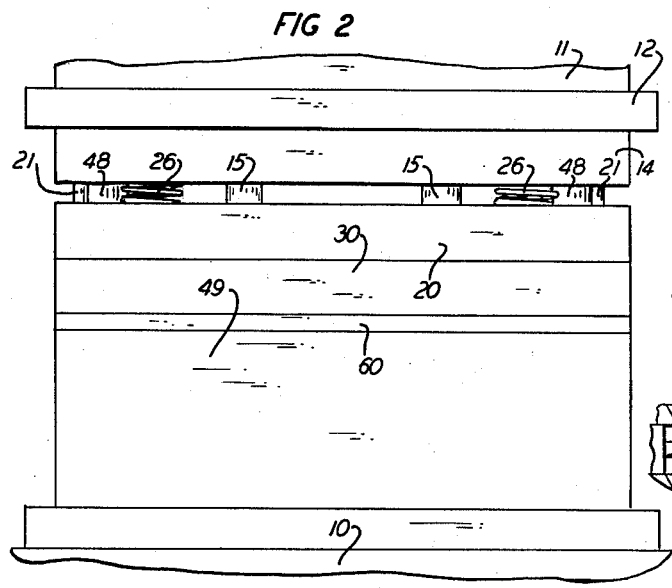
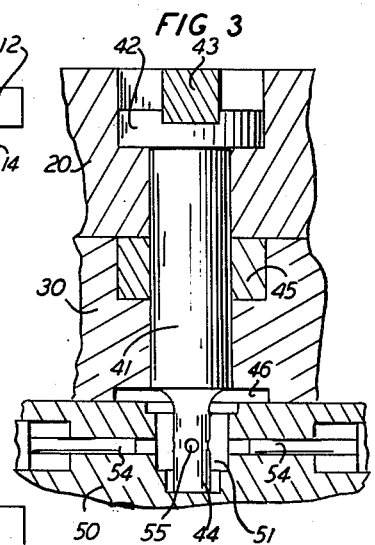
INVENTOR
D. C. MORRIS
BY *W. E. Parnell*
ATTORNEY May 20, 1958
D. C. MORRIS
2,834,988
MOLD FOR 47-TYPE CONNECTOR BLOCK BODIES
Filed March 24, 1954
2 Sheets-Sheet 2
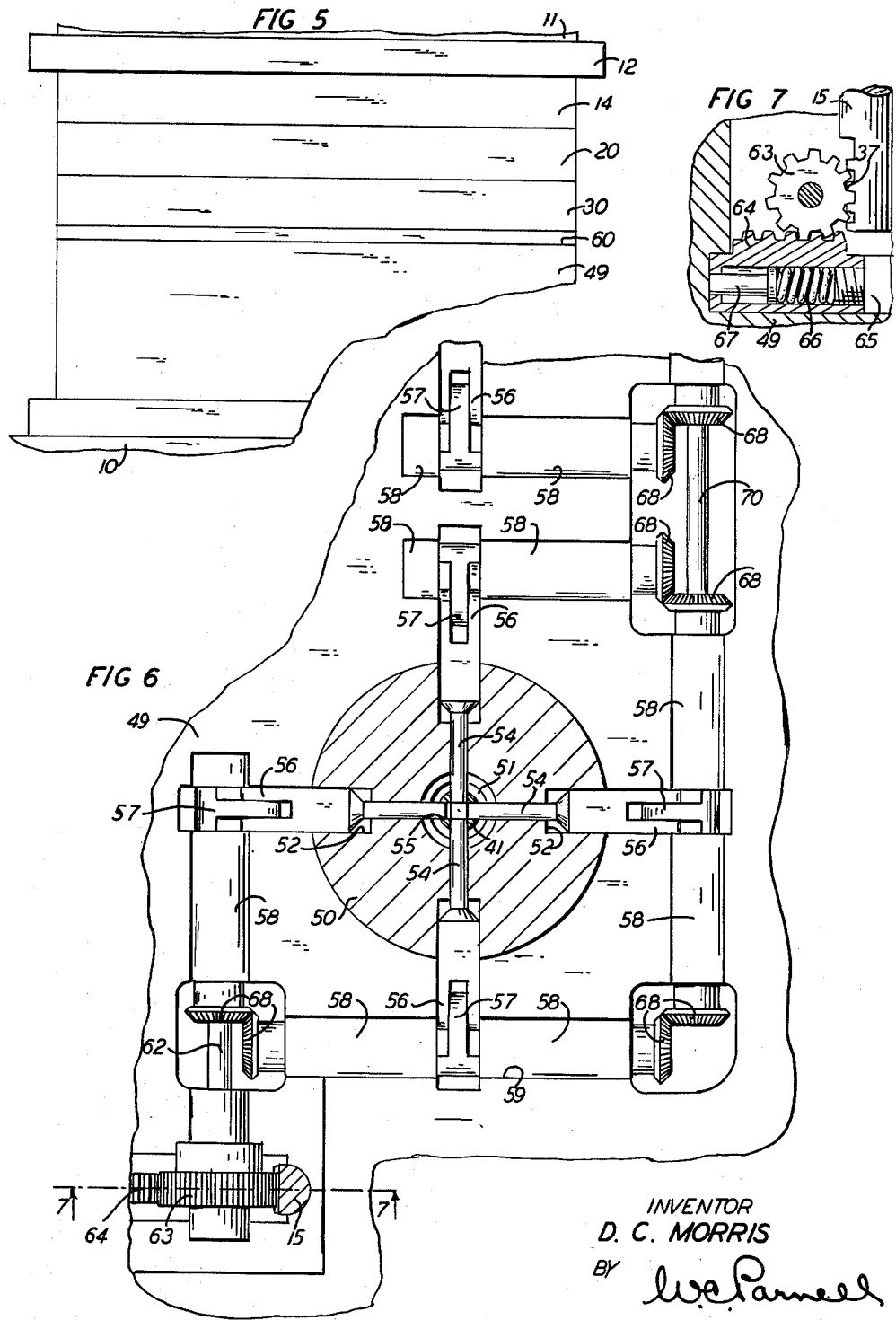
INVENTOR
D. C. MORRIS
BY
ATTORNEY

United States Patent Office 2,834,988
Patented May 20, 1958

2,834,988

MOLD FOR 47-TYPE CONNECTOR BLOCK BODIES

Donald C. Morris, Indianapolis, Ind., assignor to Western Electric Company, Incorporated, New York, N. Y., a corporation of New York Application March 24, 1954, Serial No. 418,251

4 Claims. (Cl. 18—42)

This invention relates to molds and more particularly to apparatus for molding articles having apertures therein disposed at angles with respect to each other.

In molding a hollow article or one having a single aperture therein (for example, in an injection molding press) the usual practice of using a single core having a contour conforming to that desired for the inner portion of the article, may be followed. However, when the article is to have several apertures at various angles, the mold must be provided with the necessary additional removable cores in proper relation to each other and to the main core. In addition, to adapt such a mold for use in a cyclically operating press, it is necessary to insure that the various cores are inserted and withdrawn in the proper sequence to assemble the mold and permit it to be opened at the end of a molding cycle without damaging the mold or the article.

The object of the invention is an apparatus embodying the solutions to these problems of molding an article having apertures therein disposed at angles with respect to each other.

With this and other objects in view, the invention comprises a molding apparatus having a mold cavity with cores movable into and out of the mold cavity at angles with respect to each other.

More specifically, the apparatus includes a main core having apertures therein and connected to a reciprocable member adapted to move it into and hold it in the mold cavity. In the present embodiment of the invention, there are four mold cavities, each with a main core with apertures therein, simultaneously actuated by the reciprocable element and holding means while each mold cavity is provided with a set of four auxiliary cores operatively connected to power means originating in racks actuated by a reciprocable member, so that the sets of auxiliary cores will be operated simultaneously for movement into interengagement with their main cores in their respective apertures and subsequently moved free of their main cores and their cavities while the main cores are held in the mold cavities.

Other objects and advantages will be apparent from the following detailed description when considered in conjunction with the accompanying drawings, wherein:

Fig. 1 is a front elevational view of the apparatus with numerous portions thereof shown in section;

Fig. 2 is a front elevational view of the apparatus illustrating the relationship of certain parts thereof short of the completion of the downward stroke of the ram of the press;

Fig. 3 is a fragmentary vertical sectional view illustrating one of the main cores, the mold cavity and certain of the auxiliary cores of one of the four molding units;

Fig. 4 is an isometric view of the article;

Fig. 5 is a front elevational view of the apparatus in the completely closed position;

Fig. 6 is a fragmentary horizontal sectional view of one of the molding units, and Fig. 7 is a fragmentary sectional view taken substantially along the line 7—7 of Fig. 6.

The apparatus shown in Figs. 1, 2 and 5, is mounted on a bed 10 of a press having a ram 11 reciprocable between given limits to move the apparatus from open position shown in Fig. 1 to the closed position shown in Fig. 5. A plate 12 is fixed to the ram 11 by suitable means (not shown) and a plate 14 is fixed to the plate 12 in any desired manner. Although there are four mold cavities, the driving means for the auxiliary cores of two adjacent mold cavities are operated by single racks 15, only one of which is shown in the drawings. The rack 15 is disposed in an aperture 16 of the member 14 and is supported by an adjusting screw 17 held by a fixed position washer 18.

A plate-like element 20 is supported by screws 21 positioned in apertures 22 in the member 14 while the heads 23 of the screws are free to move a distance necessary to close the space between surfaces 24 and 25 of the elements 14 and 20. The plate-like elements 14 and 20 are normally urged away from each other by a suitable number of spaced strong springs 26 disposed in recesses 27 in the element 24 and resting on the surface 25 of the element 20.

Another plate-like element 30 similar in contour to the elements 14 and 20 is supported by suitable means, such as screws 31, and is normally urged away from the element 20 (as shown in Fig. 1) by springs 32 nesting in recesses 33 of the element 30 and engaging the undersurface of the element 20. The springs 32 are weaker or have less force than the springs 26 so that the springs 32 will be compressed during downward movement of the ram before the springs 26 are compressed. It will be noted that aligned apertures 35 and 36 are formed in the elements 20 and 30 for the rack 15 and that the lower portion of the rack 15 is cut away to provide gear teeth 37.

The element 20 is apertured at 40 to receive a main core 41 having a head 42 recessed to receive a retaining element 43 having its ends held in a slot (not shown) in the element 20 to hold the main core against displacement. The lower portion 44 of the main core which forms the main aperture in the article (shown in Fig. 4) is movable in a bushing 45 disposed in an aperture of the element 30, a lower portion 46 of the aperture forming a part of the mold cavity. The elements 20 and 30 are held in their proper relationship with respect to each other and the element 14 by the aid of conventional guide pins or posts 48 held by the lower portion 49 of the apparatus which is mounted directly on the bed 10.

The portion 49 of the apparatus includes four mold units but as they and their associated mechanisms are substantially identical with each other, only one mold unit is illustrated. Attention is now directed to Figs. 3, 6 and 7, wherein a mold 50 has a cavity 51 therein disposed in alignment with the portion 46 (Fig. 3) concentric with the main core 41. The mold unit 50 has apertures 52 therein disposed 90° apart to movably receive auxiliary cores 54. The inner ends of the auxiliary cores are receivable in apertures 55 of the main core 41 (as shown in Fig. 6). The enlarged outer ends of the auxiliary cores 54 are bifurcated at 56 and are operatively connected to levers 57 so that rocking movements of the levers will reciprocate the auxiliary cores. The levers 57 are mounted on shafts which are journalled in bearings 58. The bearings 58 are disposed in semi-cylindrical recesses 59 and are held in place in similar recesses of a cover 60 (Fig. 1). By viewing Fig. 6, it will be noted that one of the shafts indicated at 62 has a pinion 63 mounted thereon and positioned for interengagement with its respective rack 15. A toothed element or rack 64 slidable in an aperture 65 of the member 49 interengages the pinion 63 to normally rock the pinion counterclockwise through the force of a spring 66 against a plunger 67. This means assures actuation of the pinion counterclockwise to operate the various shafts associated therewith so that their connecting bevelled gears 68 will rock the shafts in the proper directions to actuate their levers 57 simultaneously to move the auxiliary cores 54 out of their apertures 55 and the mold cavity 51. A shaft 70 in the group of shafts (shown in Fig. 6) extends beyond this group and becomes a part of an adjacent group so that the rack 15 (shown in Fig. 6) may actuate both groups of auxiliary cores simultaneously to move them into their mold cavities and the aligned apertures 55 of the main cores.

Considering now the operation of the apparatus, let it be assumed that the conventional passageways are provided in the member 49 leading to the mold cavities and provided with the necessary feeding means for the material to be injected in the mold cavities after they are closed and the main and auxiliary cores are moved into their interlocking positions. When the apparatus is in the position shown in Fig. 1, the molded articles may be removed therefrom by means not shown. The article 72 (Fig. 4) includes a main or central aperture 73 with other apertures 74 disposed at angles with respect to each other and the main aperture.

With the lower portion of the apparatus including the member 49 and the cover 60, housing the auxiliary cores 54 and the operating mechanisms therefor, excepting the racks 15, supported by the bed 10 of the press, attention is directed to the action which takes place during closing of the mold or movement of the apparatus toward the closed position as represented by the partially closed illustration in Fig. 2 and the completely closed illustration in Fig. 5. During downward movement of the ram 11, the elements 14, 20 and 30 will follow in their respectively spaced positions until the element 30 comes to rest on the cover 60 of the member 49. During further movement of the ram downwardly, the springs 32 will be compressed until the element 20 rests on the element 30, the springs 26 maintaining the spaced position between the elements 14 and 20. At this time, the main core 41 enters the mold cavity 50 in each unit and becomes seated therein as shown in Fig. 3. At this time, the apertures 55 in the lower portions of the main cores are disposed in alignment with their respective auxiliary cores 54.

During the final downward movement of the ram, the apparatus is moved from the position shown in Fig. 2 to that shown in Fig. 5, compressing the springs 26 and causing the rack 15, in each instance, to operate its pinion 63 to move its spring-pressed rack 64 from the position shown in Fig. 1 to that shown in Fig. 5, and to cause simultaneous rocking of the shafts about each mold cavity, through the connections of the bevelled gears, to rock the levers 57 inwardly simultaneously to move the auxiliary cores 54 from the positions shown in Fig. 3 to the positions shown in Fig. 6, where the cores are held. The auxiliary cores remain interlocked with their main cores until the material is ejected into the mold cavities, after which, the ram 11 is moved upwardly causing movement of the elements 14, 20 and 30 in the same order so that the auxiliary cores will be moved from the apertures of their main cores and the mold cavity prior to the removal of the main cores. This is brought about due to the combined force of the springs 26 holding the element 20 against the element 30 until the element 14 has moved its full distance from the element 20 causing the racks 15 to rock their pinions 63 in a counterclockwise direction assisted by the racks 64 and their springs 66. After the auxiliary cores are free of the main core and mold cavities, the screws 21 will pull the element 20 upwardly to space it from the element 30 which remains held on the cover 60 by the springs 32 until the screws 31 lift the element 30 and the elements 14, 20 and 30 again assume the positions shown in Fig. 1. At this time, the molded articles may be ejected from the mold cavities and the apparatus is ready for its next operation.

It is to be understood that the above described arrangements are simply illustrative of the application of the principles of the invention. Numerous other arrangements may be readily devised by those skilled in the art which will embody the principles of the invention and fall within the spitrit and scope thereof.

What is claimed is:

1. An apparatus for molding an article having apertures therein disposed at angles with respect to each other, the apparatus comprising a mold cavity, a main core having apertures therein, auxiliary cores having inner ends receivable in their respective apertures of the main core when disposed in the mold cavity, means to move the main core into the mold cavity and hold the main core therein, a mechanism including rockable shafts operatively connected to each other so that rocking of one shaft will rock the other shafts like distances, means operatively connecting the auxiliary cores to their respective shafts to cause movement of the auxiliary cores during rocking of the shafts, a pinion mounted on one of the shafts, a first rack actuable in timed relation with the main core to rock the pinion and shafts to move the auxiliary cores into the mold cavity and their apertures in the main core, and a second rack normally urged in one direction by a spring which is compressed when the second rack is moved in a reverse direction during rocking of the pinion by the first rack to reverse the rocking movements of the pinion and shafts to withdraw the auxiliary cores from the apertures and mold cavity.

2. An apparatus for molding a hollow article with apertures disposed at angles with respect to each other, the apparatus comprising a stationary mold cavity, auxiliary cores disposed at angles with respect to each other and adapted for movement into and out of the mold cavity, a mechanism including rockable shafts operatively connected to each other and to their respective auxiliary cores so that rocking of one shaft in either direction to move its auxiliary core into and out of the mold cavity will rock the other shafts like distances to impart like movements to their respective auxiliary cores, a ram reciprocably movable through single operating cycles into open and closed positions relative to the mold cavity, a series of members supported by the ram spaced from each other when the ram is in the open position and engaging each other when the ram is in the closed position, means embodied in one of the members to close the mold cavity, a main core carried by another of the members and movable into and seated in the mold cavity, an element carried by still another of the members to rock one of the shafts of said mechanism to cause movement of the auxiliary cores into the mold cavity, and means to control the relative movement of the members out of their closed positions in a reverse order from that in which they moved into their closed positions.

3. An apparatus for molding a hollow article with apertures disposed at angles with respect to each other, the apparatus comprising a stationary mold cavity, auxiliary cores disposed at angles with respect to each other and adapted for movement into and out of the mold cavity, a mechanism including rockable shafts operatively connected to each other and to their respective auxiliary cores so that rocking of one shaft in either direction to move its auxiliary core into and out of the mold cavity will rock the other shafts like distances to impart like movements to their respective auxiliary cores, a ram reciprocably movable through single operating cycles into open and closed positions relative to the mold cavity, a series of members supported by the ram spaced from each other when the ram is in the open position and engaging each other when the ram is in the closed position, means embodied in one of the members to close the mold cavity, a main core carried by another of the members and movable into and seated in the mold cavity, an element carried by still another of the members to rock one of the shafts of said mechanism to cause movement of the auxiliary cores into the mold cavity, means to control the relative movement of the members out of their closed positions in a reverse order from that in which they moved into their closed positions, whereby said mechanism will be free for actuation of the auxiliary cores out of the mold cavity, the main core then will be moved free of the mold cavity and finally the mold cavity will be opened.

4. An apparatus for molding a hollow article with apertures disposed at angles with respect to each other, the apparatus comprising a stationary mold cavity, auxiliary cores disposed at angles with respect to each other and adapted for movement into and out of the mold cavity, a mechanism including rockable shafts operatively connected to each other and to their respective auxiliary cores so that rocking of one shaft in either direction to move its auxiliary core into and out of the mold cavity will rock the other shafts like distances to impart like movements to their respective auxiliary cores, a ram reciprocably movable through single operating cycles into open and closed positions relative to the mold cavity, a series of members supported by the ram spaced from each other when the ram is in the open position and engaging each other when the ram is in the closed position, means embodied in one of the members to close the mold cavity, a main core carried by another of the members and movable into and seated in the mold cavity, an element carried by still another of the members to rock one of the shafts of said mechanism to cause movement of the auxiliary cores into the mold cavity, means to control the relative movement of the members out of their closed positions in a reverse order from that in which they moved into their closed positions, whereby said mechanism will be free for actuation of the auxiliary cores out of the mold cavity, the main core then will be moved free of the mold cavity and finally the mold cavity will be opened, and means adapted to actuate said mechanism to move the auxiliary cores free of the mold cavity.

References Cited in the file of this patent

UNITED STATES PATENTS

| | | |
|---|---|---|
| 1,607,677 | Korsmo | Nov. 23, 1926 |
| 1,876,940 | Hotter | Sept. 13, 1932 |
| 1,967,796 | Weiss | July 24, 1934 |
| 1,974,822 | Lannert | Sept. 25, 1934 |
| 2,252,090 | Morin et al. | Aug. 12, 1941 |
| 2,287,524 | Jackson | June 23, 1942 |
| 2,350,971 | Pecker et al. | June 6, 1944 |
| 2,474,963 | Wessel | July 5, 1949 |
| 2,621,380 | Townhill | Dec. 16, 1952 |